United States Patent [19]

Flodell

[11] 3,807,312

[45] Apr. 30, 1974

[54] VEHICLE PROPULSION, TRACK, AND SWITCH SYSTEM

[76] Inventor: Bertil G. Flodell, Snapphanevagen 124, 175 00 Jakobsberg, Sweden

[22] Filed: Feb. 1, 1972

[21] Appl. No.: 222,554

[52] U.S. Cl............... 104/147, 104/91, 104/99, 104/119, 104/243, 105/30, 105/144, 105/148, 105/215 R
[51] Int. Cl..... B61b 3/02, B61c 11/00, B61d 15/12
[58] Field of Search............. 104/94, 95, 99, 147 R, 104/243, 247, 91, 119; 105/30, 153, 215 R, 144, 148, 253

[56] References Cited
UNITED STATES PATENTS

| | | | |
|---|---|---|---|
| 2,316,223 | 4/1943 | Cheneau | 105/30 |
| 3,111,910 | 11/1963 | Pao | 105/30 X |
| 415,209 | 11/1889 | Johnston | 104/99 X |
| 3,456,597 | 7/1969 | Jackson | 104/95 X |
| 3,727,560 | 4/1973 | Blemly et al. | 104/147 R |
| R18,493 | 6/1932 | Dinkelberg | 214/16.1 CA |
| 173,240 | 2/1876 | Riley | 104/120 X |
| 928,435 | 7/1909 | Felts | 105/29 R X |
| 1,600,767 | 9/1926 | Lockwood | 104/120 |
| 2,849,126 | 8/1958 | Kerekes | 214/16.1 CD |

*Primary Examiner*—Robert G. Sheridan
*Assistant Examiner*—Howard Beltran

[57] ABSTRACT

A conveying device comprises wheeled load carriers, each having a drive unit and a roller driven thereby. The roller cooperates with a rail for moving the carrier therealong. The carrier is guided along desired tracks having switches and the drive unit with its roller is pivotally connected to the carrier about a vertical axis to enable said carrier to be always oriented in the same direction.

7 Claims, 8 Drawing Figures

VEHICLE PROPULSION, TRACK, AND SWITCH SYSTEM

DESCRIPTION

This invention refers to a conveying device of the kind having wheeled load carriers adapted to be moved along a predetermined path. More specifically the invention is concerned with devices of the above-mentioned kind in which each carrier has a drive unit, comprising a motor and drive means, driven thereby.

The main object of the invention is to devise a conveying device in which the track along which the load carriers are to be moved is simple in that it has no bent portions and in which the load carriers have a fixed orientation independent of the direction of the track thereby limiting space requirement, facilitating loading and unloading and the like.

These and other advantages are obtained by carrying out the invention according to the claims.

The invention will now be described with reference to the accompanying drawings in which FIG. 1 is a perspective view, partly broken, of a device according to the invention, and illustrates a track being located in the floor plane and a load carrier travelling therealong.

Figure 1:
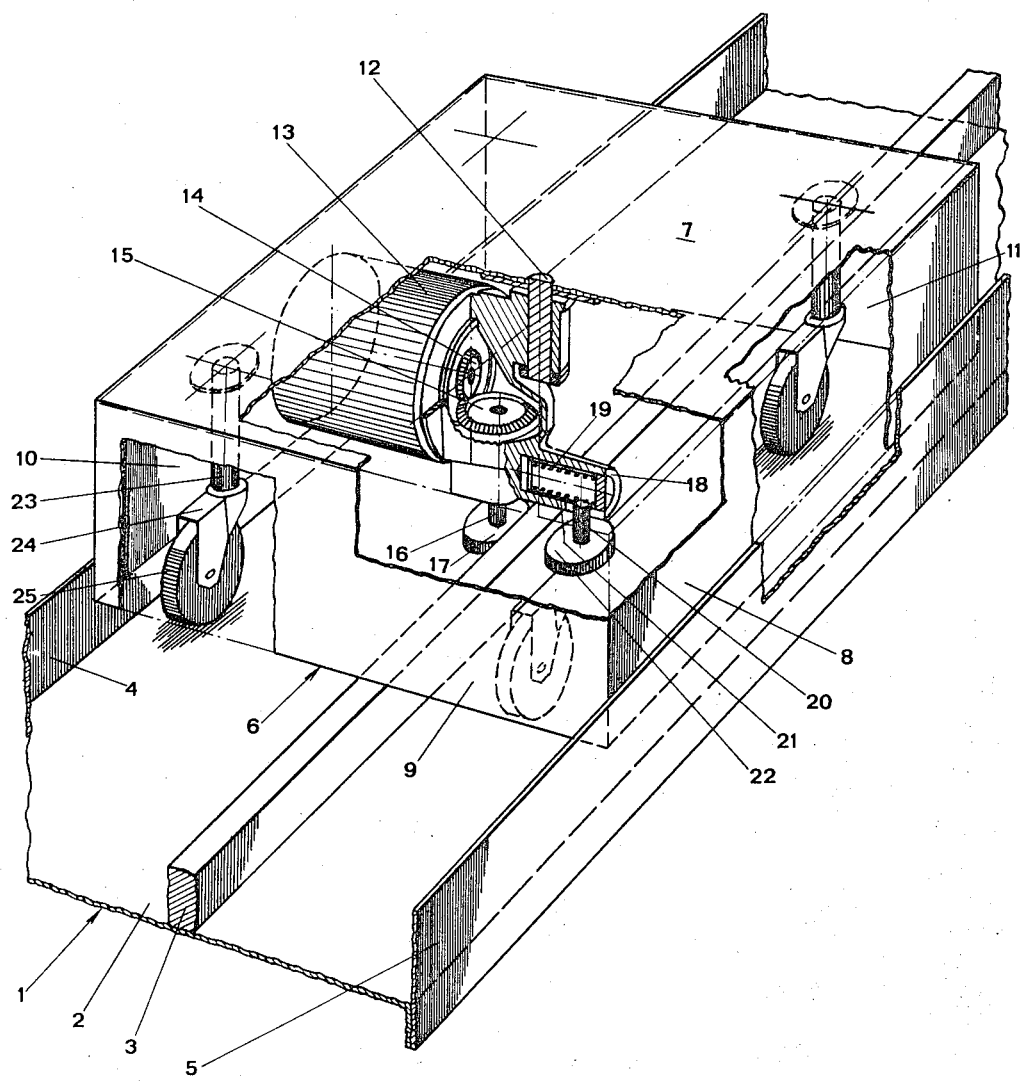
Figure 2:
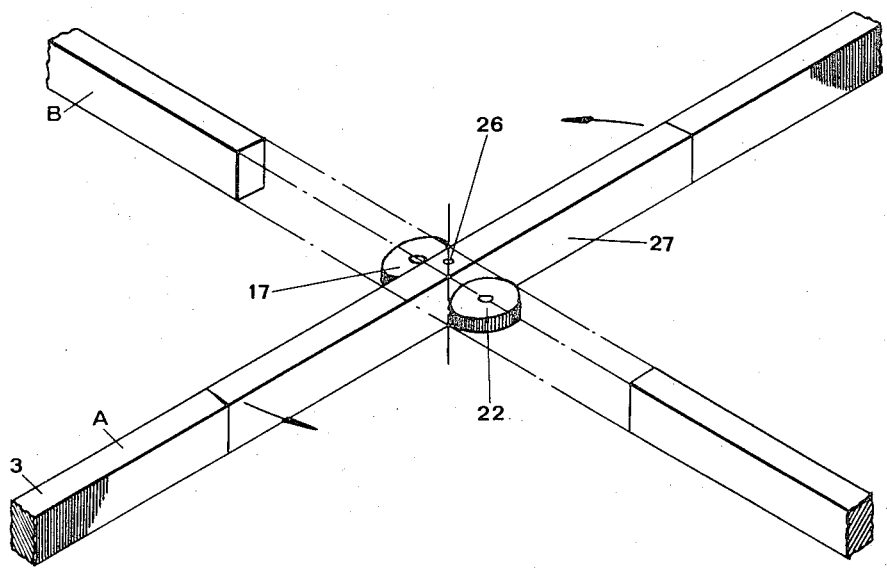
FIG. 2 and 3 illustrate schematically two crossing tracks and means for transferring the load carrier from one of these tracks to the other.
Figure 3:
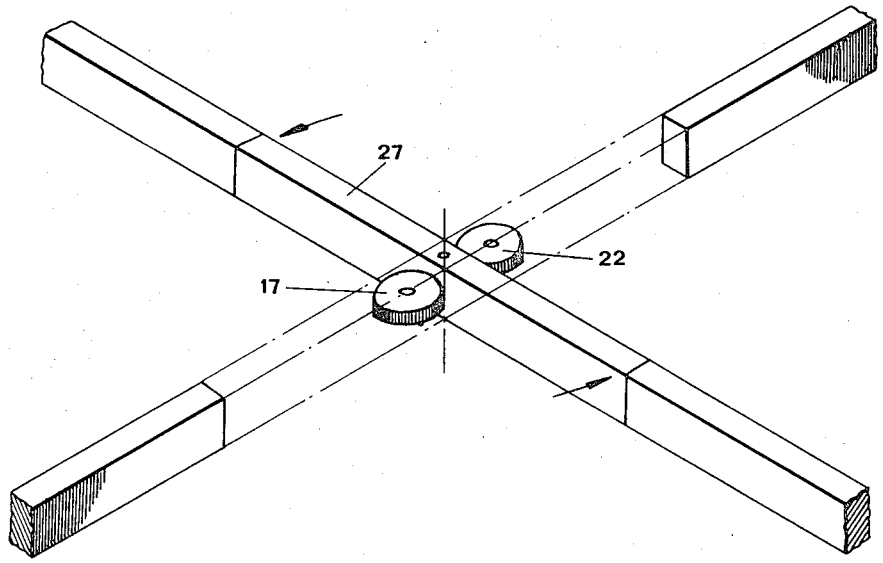

A first embodiment of the invention will now be described with reference to FIGS. 1 - 4 inclusive. The numeral 1 generally designates the track along which the load carriers are to be moved. According to the preferred embodiment shown in FIG. 1, said track includes a sheet metal member 2 having its ends bent downwardly to constitute a profile having a modified inverted U-shape. Secured to said profile for instance by means of hot welding is a longitudinal beam 3, which may be hollow and centrally adapted relative to vertical plates 4 and 5 forming side walls of the track. Said vertical plates are secured to the vertical sides of profile 2.

The load carriers adapted to be moved along the track are generally designated 6 and may each comprise a box-shaped member having a top wall 7 and downwardly directed side walls 8, 9, 10, 11. Secured to the top wall 7 or a plate connected therewith is a vertical pivot 12, by means of which an electrical motor 13 is pivotally connected to the top wall. The motor has secured to its drive shaft a bevel gear 14 engaging another bevel gear 15, which latter is secured to the upper end of a vertical shaft 16, which is rotatably mounted in an extension of the motor stand. The lower end of said shaft has keyed thereto a drive roller 17. The periphery of said roller is preferably rubber coated or treated in a similar way to produce a certain friction against the surface along which it is to roll. The motor stand also has an axially extending sleeve portion 18 which serves as a guide for a tubular member 19, having secured thereto a downwardly extending stub shaft 20, projecting through an elongated opening or slot 21 in said sleeve portion. The tubular member is preferably closed at one end and is influenced by a spring urging to press it to the left in FIG. 1. An idle roller 22 is rotatably connected to the lower end of said stub shaft 20. From the top wall 7 of the box-shaped member extends downwardly four shafts 23, each being rotatably connected to a bracket 24 serving as a support for a roller 25.

It is obvious that the load carrier now described is advanced along the track when its motor is energized. The spring-influenced roller 22 then serves to keep the drive roller in frictional engagement with the side of the central beam or rail 3. When it is however desired to transfer the load carrier from a first track designated A in FIG. 2 to a second track B the following procedure which may be carried out fully automatically by using conventional technique takes place.

The tracks are in every crossing region interrupted and pivoted about a vertical axis 26, passing through the central crossing point is a rail section 27, the length of which correspond to the interruption in each track. When the load carrier which is thought to come from the left in FIG. 2 has reached a position in which its rollers 17, 22 are in the illustrated position centrally on the rail section 27 said latter is turned according to the arrows. During this operation the drive motor is deenergized but as soon as the rail section has reached the position according to FIG. 3 it is again energized and the load carrier will now be moved along track B and to the left.

If it was however desired to move the load carrier in the opposite direction the rail section 27 should have been turned in the opposite direction i.e., in a clockwise direction instead of the anti-clockwise movement indicated above. Of course, it is also possible to change the running direction by reversing the motor.

Figure 4:
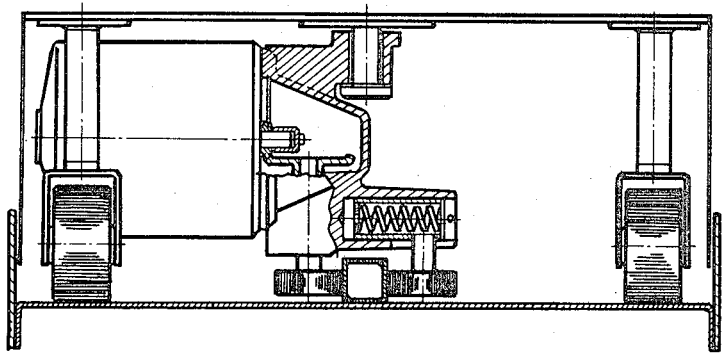
FIG. 4 is an end view of the load carrier according to FIG. 1.
Figure 5:
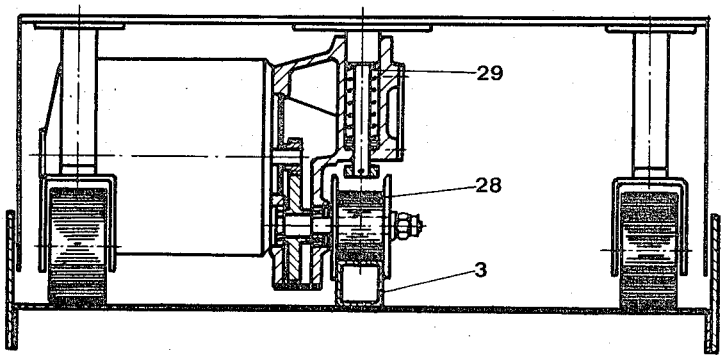
FIG. 5 is an end view of a modified load carrier having only one drive roller.

FIG. 4 is an end view of the first embodiment of the invention but it will be obvious from a study of FIG. 5 that a still simpler construction may be obtained by arranging a flanged drive roller 28 adapted to rotate about a horisontal axis. The drive unit is also in this embodiment adapted to pivot about a vertical axis, located vertically above the symmetry plane of the drive roller 28. It is obvious that the drive roller 28 must be pressed against the single rail 3 in a vertical direction. The gravity of the drive unit serves this purpose but as indicated in FIG. 5, this pressing action may be assisted by a coil spring 29 housed in a sleeve portion of the drive unit and urging the drive unit downwardly.

Figure 6:
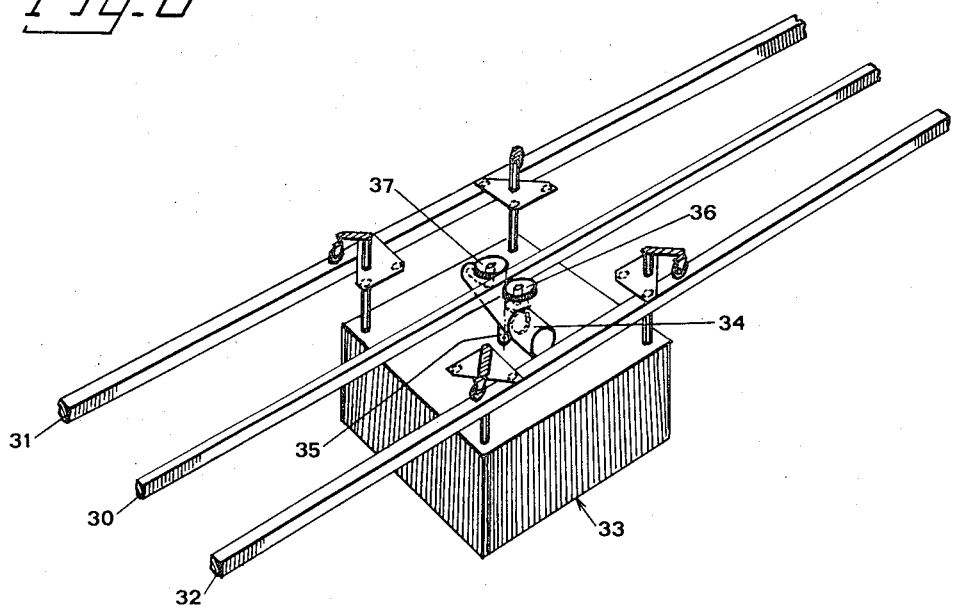
FIG. 6 is a perspective view of a conveying device having load carriers hanging in rails, being located in the ceiling plane and forming the track for the load carriers.

The embodiments just described may be used for transports on different heights but when it is desired to arrange the transport near the ceiling the embodiment illustrated in FIG. 6 may be employed.

Figure 7:
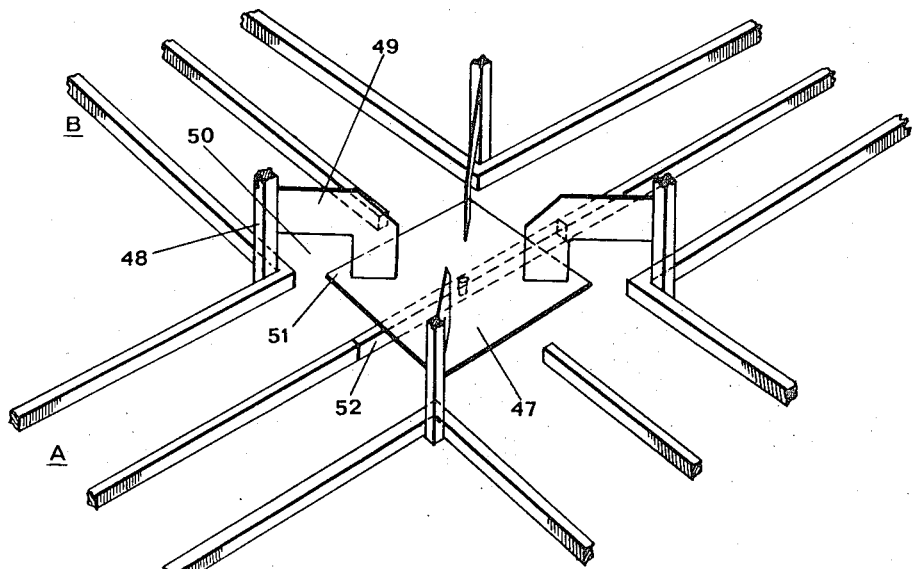
FIG. 7 shows in an enlarged scale two crossing ceiling tracks.
Figure 8:
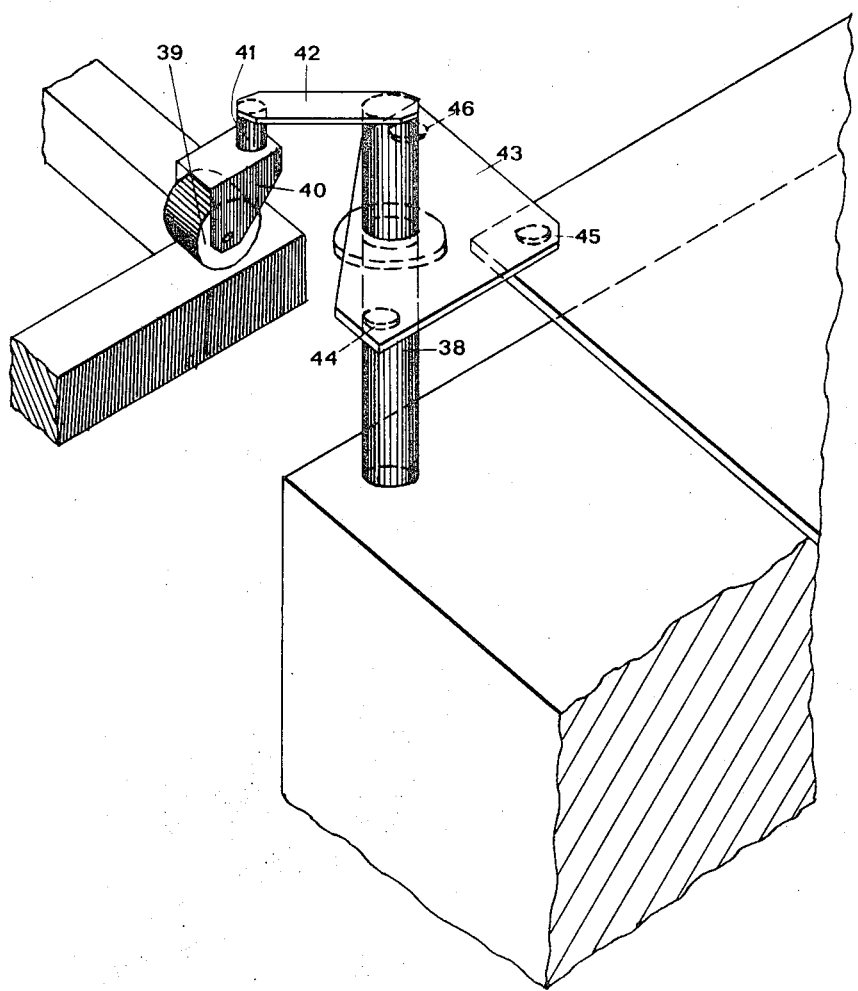
FIG. 8 shows on an enlarged scale a detail of the load carrier as shown in FIG. 6.

A central rail 30 as well as side guide rails 31 and 32 are secured to the ceiling or any other support such that a small space is apparent between the rails and the ceiling. The load carrier generally designated 33, is adapted to be moved along the rails hanging in the same and for this purpose the drive unit 34 is pivotally connected by means of a vertical shaft 35 to the top wall of the load carrier. Said drive unit serves to drive drive roller 36 and a spring influenced idle roller 37 serves to hold the drive roller in contact with the central rail 30, principally as described in connection with the first embodiment. The means for guiding the load carrier relative to the side rails 31 and 32 will now be described with reference to FIG. 8. Secured to the top wall of load carrier 33 are four uprights 38 each serving as a suspending means for a roller 39. For this purpose each roller is rotatably mounted in a bracket 40, pivotally connected by means of a vertical shaft 41 to an arm 42 which in turn is connected to the upper end of upright 38. Rigidly secured to said upright at a vertical distance below arm 42 is a triangular plate 43 which near its corners have downwardly projecting antifriction means for example balls 44 – 46, adapted in suitable fittings or holes. The plates 43 are located at such a distance below the upper end of upright 38 that the lower portion of each ball is located in the same horizontal plane as the upper surface of the rails. Thus the balls may assist in suspending the load carrier as it is moved along the track. The load carrier just described will thus be moved along a track in a manner that is similar to the one described in connection with the first embodiment of the invention. To enable the load carrier to be transferred from a track A to a crossing track B the arrangement according to FIG. 7 may be used. In the area in which the two tracks cross each other a plate 47 is adapted. The dimension of said plate is such that a space is generated between each of the four sides of the plate and the corresponding rail parts such that the uprights 38 may pass therebetween. Four uprights 48 having outriggers 49 serve to fix the plate 47 in the position just mentioned and with said plate in level with the upper rail portion. As shown the outriggers have cut out portions 50 to enable the rollers 39 and their brackets 40 as well as the arms 42 to pass through. The downwardly projecting portions of the outriggers which are secured to plate 47 are further located at a distance from each corner of said plate to generate a space 51. Secured to the under side of plate 47 is further a rail section 52 adapted to bridge the distance between the rail portions facing each other in the crossing section. When it is thus desired to transfer the load carrier from track A to track B the load carrier is first moved to a central position in which each upright 38 extends in the space between the rails and the plate as clearly shown in FIG. 8. In this position one of the balls 44 – 46 engages the upper side of plate 47. Owing to the spaces 51 and the cut outs 50 of the outriggers 49 the plate 47 may now be turned a quarter of a revolution. During this turning operation the load carrier is suspended by the rollers 39 assisted by the balls 44 – 46. When again energised the motor will move the load carrier along track B as previously described.

I claim:

1. A conveying device system comprising tracks each having at least one guide rail, wheeled load carrier capable of moving along at least said guide rail, each carrier having a drive unit with at least one element thereof capable of cooperating with said guide rail for moving said load carrier, said tracks having meeting areas in which said tracks are interrupted, a rail segment being positioned in said interrupted portion of said tracks and being pivotally mounted so as to extend in one angular position thereof in the length direction of one of said tracks and in another angular position extend in the length direction of the other track, said rail segment preferably being pivotable in both directions and said drive unit being pivotally connected to said load carrier by means of a shaft which when the load carrier has reached a predetermined position on the track is coaxial with the pivot center of said rail segment thereby enabling said load carrier to be transferred from one of said to another upon pivoting said rail segment from one of said angular positions to the other, each drive unit comprises an electric motor driven drive roller engaging one side of said guide rail and a spring pressed roller pressing against the opposite side of said guide rail.

2. A conveying device system as claimed in claim 1 wherein said drive unit comprises an electric motor operatively connected to said drive roller, said drive roller having side flanges on opposite sides of said guide rail and said drive roller being pressed against said guide rail by means of the gravity on said load carrier.

3. A conveying device system as claimed in claim 1, wherein said drive unit comprises an electric motor having a projection, a vertical shaft is rotatably connected to said projection and extends from a horizontal part of said load carrier, a guide is housed in said projection, a second vertical shaft is slideably mounted in said guide in a manner such that said second vertical shaft may be transversally moved in a direction towards and away from said guide rail and a second roller on said second vertical shaft engages the opposite side of said guide rail.

4. A conveying device system as claimed in claim 3 wherein the axis of said first vertical shaft is located in a vertical symmetry plane extending through said guide rail.

5. A conveying device system as claimed in claim 3 wherein a tubular member is slideably mounted in said guide and is connected to said second vertical shaft, a spring is also housed in said guide and urges said second vertical shaft towards said guide rail pressing said second roller thereagainst.

6. A conveying device system as claimed in claim 1, wherein said track includes a plurality of rails, means supports said rails from an overhead support, said carrier is provided with vertical upwardly directed shafts, brackets are each connected to one of said upwardly directed shafts, a roller on each of said brackets is capable of rolling on the upper side of one of said guide rails.

7. A conveying device system as claimed in claim 6 wherein said track has interrupted crossing points, a plate is positioned level with the upper sides of said guide rails and at such a distance from said guide rails taht said shafts of said rollers may pass between said guide rails and said plate.

* * * * *